United States Patent [19]
Eickmann

[11] 3,983,833
[45] Oct. 5, 1976

[54] HYDRAULICALLY CONTROLLED FLUIDSTREAM DRIVEN WATERBORN VEHICLE

[76] Inventor: Karl Eickmann, 2420, Isshiki, Haxama, Kanagawa, Japan

[22] Filed: Feb. 21, 1975

[21] Appl. No.: 552,127

Related U.S. Application Data

[63] Continuation of Ser. No. 121,681, May 10, 1971, abandoned, which is a continuation-in-part of Ser. No. 782,349, Dec. 9, 1968, abandoned, which is a continuation-in-part of Ser. No. 551,023, May 18, 1966, abandoned, and a continuation-in-part of Ser. No. 328,395, Dec. 5, 1963, Pat. No. 3,320,898.

[52] U.S. Cl. .............................. 115/34 A; 115/37; 244/17.23; 244/60
[51] Int. Cl.² ........................................ B63H 5/08
[58] Field of Search ................. 115/34 R, 34 A, 35, 115/37; 244/17.11, 17.19, 55, 53, 60, 17.23

[56] References Cited
UNITED STATES PATENTS

| 2,212,490 | 8/1940 | Adler, Jr. ............................ 244/53 |
|---|---|---|
| 2,454,138 | 11/1948 | Delzer ................................. 244/60 |
| 2,486,049 | 10/1949 | Miller ................................. 115/35 |
| 3,234,856 | 2/1966 | Martin ............................. 115/34 A |

FOREIGN PATENTS OR APPLICATIONS

| 58,961 | 5/1913 | Austria ......................... 244/17.11 |
|---|---|---|
| 443,139 | 9/1912 | France ............................ 115/34 A |
| 26,279 | 11/1913 | United Kingdom .............. 115/34 A |

*Primary Examiner*—Stephen G. Kunin
*Assistant Examiner*—Stuart M. Goldstein
*Attorney, Agent, or Firm*—Michael J. Striker

[57] ABSTRACT

An air, water, or land vehicle has a body adapted to travel in a normal direction of travel and having a pair of forwardly directed propellers symmetrically spaced to each side of the centerline of the vehicle and each carried on a respective fluid motor. An engine on the vehicle drives at least one pump having two independent working chambers each of whose output is connected to the input of a respective one of the propeller-carrying motors and an adjustment is provided for increasing the discharge rate of the one pump relative to the other and vice versa for steering the vehicle.

11 Claims, 6 Drawing Figures

INVENTOR.
KARL EICKMANN

INVENTOR.
KARL EICKMANN

INVENTOR.
KARL EICKMANN

HYDRAULICALLY CONTROLLED FLUIDSTREAM DRIVEN WATERBORN VEHICLE

CROSS-REFERENCE TO RELATED APPLICATION

This is a continuation of patent application 121,681 filed May 10, 1971 (now abandoned), itself a continuation-in-part of patent application 782,349 filed December 9, 1968 (now abandoned), itself a continuation-in-part of patent application 551,023 filed May 18, 1966 (now abandoned) and of patent application 328,395 filed December 5, 1963 (now U.S. Pat. No. 3,320,898). Continuation-in-part application 552,606 and divisional application 640,108 were filed May 24, 1966 and May 22, 1967 for patent application 328,395 and have since issued as Patents 3,497,162 and 3,415,197, respectively. Continuation-in-part application 104,676 and continuation application 131,782 were filed March 8, 1971 and April 6, 1971 for abandoned application 782,349 and have since issued as Patents 3,790,105 and 3,823,898.

BACKGROUND OF THE INVENTION

Hydraulically driven water-borne vehicles have already been proposed in the past. They employed either only a single working chamber group in the fluid handling device and expelled a plurality of streams so that control over the synchronization of the rotary velocity of the individual propellers were lost, or they employed control-communications between fluid lines, which interrupted the equalness of rate of flow of fluid to the fluid lines. Thus, in the hydrostatically operated propeller-driven crafts of the past control of the craft was unstable so that those vehicles could not effectively be used. Those drawbacks are overcome by the present invention.

SUMMARY OF THE INVENTION

It is now disclosed in accordance with my present invention that the fluid flow transmission means of separate flows or streams of fluid of proportionate rate of flow for driving positive-displacement fluid motors for revolving rotary members which create or actuate flows of fluid of proportionate propulsion or reaction force can be so improved or simplified, that they can be utilized for driving not only aircraft, but also land or water vehicles and can provide the stability of control of straight or curved, substantially horizontal motion of fluid stream driven vehicles. These vehicles are inexpensive, because the novel driving system is inexpensive. Furthermore these vehicles are simple, easily controlled, free of disturbing mechanical driving means and their movement will be stable because the proportionality of the preferably horizontal fluid stream pairs will govern and maintain the equilibrium of the motion-resisting and motion-creating forces which act on the vehicle.

It is therefore an object of this invention to provide an inexpensive and simple hydrostatically controlled fluid stream-driven vehicle.

Another object of the invention is to control the straightness of forward movement of a vehicle by means of the proportionality of powers, forces, directions, and/or rates of flow of a plurality of fluid streams which are actuated by rotary members which are revolved by positive-displacement hydraulic motors, whose rotary angular velocity is maintained or governed by the proportionality of the power-transmitting separate fluid flows.

A further object of the invention is to provide fluid-flow means for driving fluid-stream driven vehicles in curves.

Another object of the invention is to provide a hydraulically controlled fluid-stream driven vehicle comprising a body; fluid flow producing means carried by said body and including a plurality of separate, positive-displacement chamber groups each including a plurality of periodically expanding and contracting working chambers which draw in and expel fluid into a fluid delivery passage common to all contracting chambers of a positive displacement chamber group but remaining separated from any other and being without any communication with any other positive-displacement chamber group of fluid delivery passage thereof; a common adjustment means for governing and maintaining proportionality of expansion and contraction of the positive displacement chambers of different positive displacement chamber groups and of the rate of flow in different fluid delivery passages relative to each other; at least one positive-displacement fluid motor connected to each one of the fluid delivery passages and to said body at spaced locations; at least one rotor member connected to each of said fluid rotors for revolving in fluid. Said fluid expelled into said fluid delivery passages is governed by said adjustment means of said fluid flow producing means and said different fluid delivery passages to flow as separate streams of equal rate of flow. At least each flow through positive displacement motor revolves the rotor member thereof so that said rotor members are governed to actuate streams of fluid of portionate rate of flow substantially at opposite or spaced locations of said body for governing the attitude and stability of rest or motion of said vehicle in or through fluid on land, in water, on water, or in the air.

A further object of the invention is to provide a vehicle wherein streams of fluid of proportionate rate of flow are governed by a plurality of flows of fluid. Said separate fluid passages, said positive displacement fluid motors, and said rotor members maintain the stable equilibrium in contrary direction to the resultant of forces which resist the movement of the vehicle or maintain the stable equilibrium in contrary direction to gravitational weight action of the mass of the vehicle.

In a vehicle wherein a plurality of fluid flow-producing means are provided each of said fluid-flow producing means supplies a plurality of separate flows of proportionate rate of flow into a plurality of separate fluid lines and at least a pair of separate fluid lines of at least two of said plurality of fluid-flow producing means are combined together to a pair of separate common fluid lines. At least a pair of said separate positive displacement fluid motors communicate with said pair of separate common fluid lines and at least each one fluid motor of said pair of positive displacement fluid motors communicates with one of said fluid lines of said pair of separate fluid lines. Means is provided for preventing return flow from said separate common fluid lines to and through one or more of said fluid-flow producing means.

Also an object of the invention is to provide a vehicle wherein a plurality of fluid-flow producing means are provided. Each of said fluid-flow producing means supplies a plurality of separate flows of fluid of proportionate rate of flow to a plurality of separate fluid lines.

Some of said plurality of fluid-flow producing means communicate together with a combined multi-flow circuit system of a plurality of separate flows of fluid of proportionate rate of flow and others of said plurality of fluid flow producing means communicate together with another combined multi-flow circuit system of a plurality of separate flows of fluid of equal rate of flow, so that both or more combined multi-flow circuit systems may either be combined or independently operated and controlled. At least a pair of separate fluid lines of at least two of a plurality of fluid-flow producing means in each of said combined multi-flow circuit systems are combined together to respective pairs of separate common fluid lines. Pairs of separate positive-displacement fluid motors, communicate with pairs of separate common fluid lines. At least each one fluid motor of said pairs of separate positive-displacement fluid motors communicate with one of the fluid lines of the pairs of fluid lines. Said combined multi-flow circuit systems by connection of rotor members to the said fluid motors actuate at least two pairs of jointly or independently operable and controllable streams of fluid, wherein the streams of each pair of streams of fluid are of proportionate rate of flow. Means are included for preventing return flow from said separate common fluid lines to and through one or more of said fluid flow producing means.

Another object of the invention is to provide a vehicle according to one or more of the above-mentioned objects, wherein at least one pair of separate fluid flows having equal rate of flow traverse respective separate delivery fluid lines to at least a pair of separate positive-displacement fluid motors for revolving the rotary parts thereof and thereto connected rotary members with proportionate angular velocity for the creation of at least a pair of streams of fluid of substantial proportionate rate of flow. Return flow fluid lines conduct the fluid flows out of and away from said positive-displacement motors. Variable bypass means are provided at least between the deliver fluid line to one of the said positive-displacement fluid motors and the return flow fluid line from the same positive-displacement motors.

Another object of the invention is a vehicle as described above wherein said bypass means or a plurality thereof are provided on a vertically and horizontally movable fluid-born vehicle for actuating and controlling the movement of the vehicle from vertical to horizontal and vice versa.

Another modification of one or more of the foregoing objects is to provide a vehicle wherein said bypass means are utilized for letting a portion of one of the separate flows of fluid of equal rate of flow escape around the positive-displacement motor in which flows said one of the separate flows of fluid, thereby decreasing the rotary angular velocity on the said fluid motor and reducing the rate of flow of the fluid stream created by said fluid motor so that thereby a fluid stream-driven vehicle —boat, aircraft, car, aircushion vehicle, sled, hydrofoil vehicle, or ship — changes its movement direction towards the side of the body at which the said bypass means is opened and narrows the rate of flow in the respective fluid stream relative to the rate of flow in another fluid stream.

A further object in combination with one or more of the above-mentioned objects of the invention is to provide a vehicle wherein an additional separate flow of a limited but preferably variable rate of flow of fluid is provided by one of the said or additional fluid flow-producing means and control means are connected to said additional flow of fluid for governing the rate of flow or the flow direction of it into one or another of said plurality of separate flows of fluid of proportionate rate of flow, so that the said additional flow of fluid enters into the respective delivery fluid passage and adds to the respective flow of fluid between a fluid flow-producing means and one of the said positive-displacement motors, so that the angular velocity of the rotary parts of the respective positive-displacement fluid motor and the thereto connected rotary members increases. In this manner the rate of flow of the fluid stream actuated by said rotary member of said fluid motor increases relative to another of said fluid streams, so that the fluid stream driven vehicle — boat, aircraft, car, aircushion vehicle, sled, hydrofoil vehicle, or ship — changes its movement direction away from that side of the body at which the additional flow is added to the fluid flow and thereby the rate of flow in the fluid stream is increased relative to another fluid stream.

An additional object of the invention is to provide a vehicle wherein adjustment means are provided on the fluid-flow producing means which govern the changing in the rate of flow in at least a pair of fluid flows, so that the changes of the rate of flow in at least a pair of fluid flows maintain proportionality of rate of flow in said fluid flows of said pair of fluid flows and the maintenance of proportionality of rate of flow in the fluid streams actuated by the rotary members driven by said fluid flows is assured thereby also at times of change of the rate of flow in the fluid flow pair, so that straight and stable movement and positioning of the vehicle is maintained also at times of change of rate of flow in a fluid stream pair.

The vehicle of the above object wherein additional control means are provided for changing the rate of flow in one of the flows of fluid relative to another of the flows of fluid for controlling the attitude of the vehicle to a limited extent by a therefrom resulting limited change of the rate of flow in one of the fluid streams relative to another is another modification of the invention.

Another object of the invention is to provide in combination with one or more of the above-mentioned objects a vehicle wherein said body is a hydrodynamically borne ship or boat which has the ability to lift its main portion out of the water with hydrofoils, wings, or ducts which are provided extending downwardly of the main portion if said body moves through water with a velocity which is high enough to create enough hydrodynamic lift on said hydrofoils, wings, or ducts to bear the whole vehicle, and wherein at least a pair of said positive-displacement fluid motors is provided below said main portion of said body or on said hydrofoils, wings or ducts, so that the at least one pair of rotary members, which are connected to said positive displacement fluid motors remain below the surface of the water and actuate at least a pair of water streams, which provide a thrust for moving the vehicle and maintaining the stability of said vehicle thereby assuring and maintaining the stability of position of said vehicle during its travel.

Another object of the invention is to provide a vehicle wherein the body is a land vehicle having wheels on which it can travel and wherein the fluid streams are air streams which provide thrust for motion of the vehicle and which provide the stability of at least a pair of thrust forces which maintain an equilibrium and stability of substantially horizontal forces which act on the vehicle during its travel.

Another object of the invention is to provide a vehicle wherein the body is a sled for sliding on glide-enabling ground, ice, sand, snow, or mud and having runners on which it can slide for travelling on said ground, and wherein said fluid streams are air streams which provide thrust for motion of the vehicle and which provide the stability of at least a pair of thrust forces which maintain an equilibrium and stability of horizontal forces which act on the vehicle during its travel.

Another object in combination with one or more of the above-mentioned inventive objects is a vehicle wherein said body includes a downwardly directed aircushion space and wherein said fluid streams are led into said air-cushion space, creating a pressure therein for bearing said vehicle on said pressure in said air-cushion space and/or the herementioned vehicle. In addition at least one positive-displacement motor or a pair of a plurality thereof is provided for driving at least one or more rotary members thereby producing at least one air stream or a pair of air streams or a plurality thereof for providing thrust for horizontal motion of said vehicle.

It is still a further object of the invention to provide a hydraulically controlled fluid stream-driven aircraft comprising a longitudinal body; fluid flow producing means carried by said body including a plurality of separate, positive-displacement chamber groups whereof each group includes a plurality of periodically expanding and contracting working chambers which draw and expel fluid into a fluid delivery passage common to all contracting chambers of a positive displacement chamber group but remaining separated from any other and being without any communication to any other positive-displacement chamber group or fluid delivery passage thereof; a common adjustment means for governing and maintaining proportionality of expansion and contraction of the positive-displacement chambers of different positive-displacement chamber groups and of the rate of flow in different fluid delivery passages relative to each other; at least one positive-displacement fluid motor connected to each one of the fluid delivery passages and to said body at spaced locations; at least one rotor member connected to each of said fluid motors for revolving in the air; said fluid expelled into said fluid delivery passages is governed by said adjustment means of said fluid-flow producing means and said different fluid delivery passages to flow as separate flows of equal rate of flow. At least each flow through each one of said positive displacement motors revolves the rotor member thereof whereby said rotor members are governed to actuate streams of air of portionate rate of flow substantially at opposite or spaced locations on said body and substantially parallel to said longitudinal body. Said actuated streams of air of proportionate rate of flow drive said aircraft and provide the stability of attitude, positioning, and motion of said aircraft.

In the aircraft of the above object said streams of air proportionate rate of flow are governed by said flows of fluid, said positive displacement fluid motors and said rotor members maintain the stable equilibrium in contrary direction to the resultant of forces which resist the movement of said aircraft.

In an aircraft according to the above-mentioned object said fluid flow producer includes one adjustment means which governs proportionately the common variation of the displacement volumes of a pair of fluid stream producing means of said fluid flow producing means and one pair of said fluid motors is provided on said aircraft. Each one fluid motor is opposite another on said aircraft and said air streams are a pair of air streams of equal rate of flow so that said air streams provide the stability of the substantially horizontal driving forces in a direction contrary to the motion-resisting forces so that the equilibrium of substantially horizontal forces which act on the vehicle is maintained by said air streams and the force and power of the driving means of the aircraft is exclusively controlled by said one adjustment means.

A further object of the invention is to provide an aircraft or helicopter including a body, fluid flow producing means carried by said body, a plurality of positive displacement motors located at spaced locations of said body, and each including rotary parts for revolving a rotary propulsion member directly or indirectly connected thereto; a delivery fluid line between said fluid flow producing means and one of said fluid motors for passing a flow of fluid from said fluid flow producing means to said one fluid motor, a medial fluid line connecting said one fluid motor with the other of said fluid motors for passing said flow of fluid from said one to said other fluid motor, means for returning said fluid flow to said fluid flow producing means and a fluid flow producing means for supply of an additional flow of fluid of limited but preferably variable rate of flow from said fluid flow producing means into said medial fluid line for increasing the rotary angular velocity of said other fluid motor and of the rotary member connected thereto so that the inclination of the axis of the aircraft or helicopter is controlled and governed by means including the rate of flow of said additional flow of fluid into said medial fluid line.

The above object is a modification in combination with an aircraft wherein at least two pairs of separate fluid flows of proportionate rate of flow in each fluid flow pair are supplied by one or more fluid flow producing means. At least two pairs of positive displacement fluid motors are carried on said aircraft and are oppositionally located respective to the axis of the aircraft. Separate fluid lines are provided for separately passing said fluid flows to said fluid motors and rotary members are connected to the rotary parts of said fluid motors for actuating two pairs of air streams of equal rate of flow of each air stream in an air stream pair so that said air streams provide the force to move the aircraft and maintain the stable equilibrium to the forces, which resist the motion of the aircraft.

In accordance with another modification said rate of flow of fluid in said fluid streams is variable and the rate of flow is controlled by the one common control means for governing fluid flow adjustment means. A plurality of fluid flow producing means delivers fluid into common fluid lines of one of said separate fluid lines. Means is provided for preventing return flow from common fluid lines into fluid flow producing means and said fluid flows are connected to means for security moment equalization of the vehicle by assuring opposite revolution of the rotary members of a rotary member pair so that the driving force and the angular velocity of the rotary members of the vehicle is controlled by the said one common control means.

A further object of the invention is a hydraulically controlled, fluid stream-driven water-borne vehicle, ship or boat comprising a longitudinal body; fluid flow producing means carried by said body including a plurality of separate positive-displacement chamber groups whereof each group includes a plurality of periodically expanding and contracting working chambers which draw and expel fluid into a fluid delivery passage common to all contracting chambers of a positive-displacement chamber group but remaining separated from any other and being without any communication to any other positive displacement chamber group of fluid delivery passage thereof; a common adjustment means for governing and maintaining proportionality of expansion and contraction of the positive-displacement chambers of different positive displacement chamber groups and of the rate of flow in different fluid delivery passages relative to each other; at least one positive-displacement fluid motor connected to each one of the fluid delivery passages and to said body at spaced locations; at least one rotor member connected to each of said fluid motors for revolving in the water; said fluid expelled into said fluid delivery passages is governed by said adjustment means of said fluid flow producing means and said different fluid delivery passages to flow as separate flows of fluid of equal rate of flow. Almost each one flow through each one of said positive displacement motors revolves the rotor member thereof whereby said rotor members are governed to actuate streams of air or water of proportionate rate of flow substantially at opposite or spaced locations of said body and substantially parallel to said longitudinal body and said actuated streams of air or water or proportionate rate of flow drive said water-borne vehicle and provide the stability of attitude, positioning, straightness, and motion of said water-borne vehicle.

In the water-borne vehicle, ship or boat of the above object said streams of air or water of proportionate rate of flow are governed by said flows of fluid and said positive displacement fluid motors and said rotor members maintain the stable equilibrium in contrary direction to the resultant of forces which resist the movement of said water-borne vehicle.

In the water-borne vehicle of the above modification many fluid flow producing means are combined to create fluid flow pairs of large but proportionate rate of flow for driving large high-pressure fluid motors of a large water-borne vehicle.

Another object of the invention is the water-borne vehicle of the above object wherein fluid pair adjustment means, like fluid-escape means or fluid-adding means, are provided for changing the rate of flow of one flow of a fluid pair relative to the rate of flow of the other flow of the fluid-flow pairs in a limited extent and wherein said fluid-flow pair adjustment means control the change of the movement direction of the vehicle.

A still further object of the invention is a hydraulically controlled propulsion unit comprising a frame; fluid flow producing means carried by said frame including a plurality of separate positive-displacement chamber groups whereof each group includes a plurality of periodically expanding and contracting working chambers which draw in and expel fluid into a fluid delivery passage common to all contracting chambers of a positive-displacement chamber group but remaining separated from any other and being without any communication to any other positive displacement chamber group or fluid delivery passage thereof; a common adjustment means for governing and maintaining proportionality of expansion and contraction of the positive displacment chambers of different positive displacement chamber groups and of the rate of flow in different fluid delivery passages relative to each other. At least one positive displacement fluid motor is connected to each one of the fluid delivery passages and to said frame at spaced locations. At least one rotor member is connected to each of the fluid motors for revolving in fluid. Said fluid expelled into said fluid delivery passages is governed by said adjustment means of said fluid flow producing means and said different fluid delivery passages to flow as separate flows of equal rate of flow at least each one flow through each one of said positive displacement motors for revolving the rotor member thereof so that said members are governed to actuate streams of fluid of a proportionate rate of flow substantially at opposite or spaced locations of said frame. Said frame and parts are connected thereto constitute together a transportable multifluid-stream propulsion unit, which can be fixed to a vehicle for driving the movement of the same and for governing the attitude and stability of motion of the respective vehicle to which the propulsion unit may be fixed.

Modifications of the above object of the invention are for example a propulsion unit wherein said rotor members are surrounded by and located in duct or ring-wings; and/or a propulsion unit wherein said positive displacement fluid motors and the thereto connected rotor members are swingably connected to said frame, so that they can be swung toward or away from the center of the frame; and/or a propulsion unit wherein at least each one fluid passage extends from each one of two of said positive-displacement fluid motors which are connected to said fluid delivery passage each to at least one downstream positive-displacement fluid motor for forcing the rotor of same to revolve with an angular velocity proportionate to the angular velocity of said positive displacement fluid motors which are connected to said fluid delivery passages; and/or a propulsion unit wherein a plurality of fluid flow producing means are provided, each of which supplies a plurality of separate flows of proportionate rate of flow into separate fluid lines and at least one fluid line of some of the plurality of the fluid flow producing means are combined together to a common fluid line and before the common fluid line a check valve means is inserted into each of the respective separate fluid lines, leading from a fluid flow producing means to the common fluid line so that if one of the fluid flow producing means fails to operate, the other fluid flow producing means continue to deliver into the common fluid line while backflow through the check valve into the failing fluid flow producing means is prevented.

Other features and objects of the invention or embodiments or modifications thereof will become apparent from the accompanying drawing.

DESCRIPTION OF THE PREFERRED EMBODIMENTS

Figure 6:
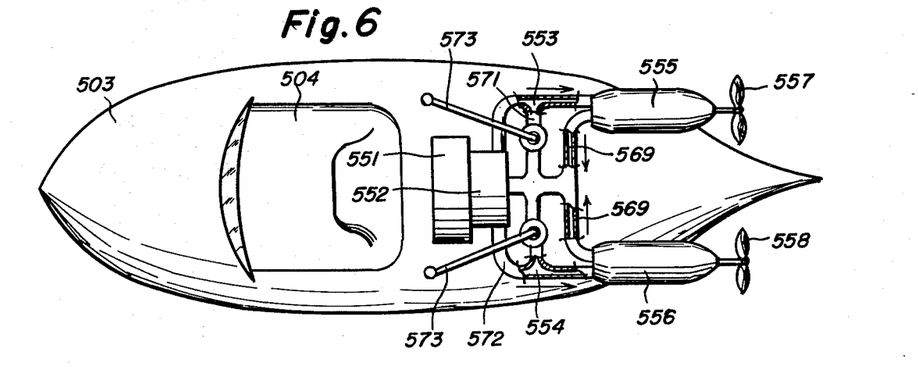
FIG. 6 shows another water-borne vehicle seen from top employing the above and further means of this invention.

In FIG. 6 the body 501 of the craft has a cabin 502 and a fluid flow producing means 532 connected to a power plant 531. Motor 535 is mounted on one side of the boat and motor 536 on the other side. Propellers 537 and 538 are mounted to said motors and driven thereby. Fluid is passed out of one working chamber group of producing means 532 through fluid line 533 to and through motor 535 and returns therefrom through fluid line 549 to the producing means 532. Out from the other working chamber group of fluid flow producing means 532 comes the other fluid line 534, which leads fluid to and through motor 536 and return therefrom again to the producing means 532 via line 549. Since, according to this invention, the actuator means of the fluid flow producing means are connected, so that the output of each working chamber group of the fluid flow producing means 532 is of equal rate of flow, both propellers are foreced to revolve with equal angular velocity, so that they are velocity-synchronized with each other through the fluid lines and the fluid flow producing means. Thus, the vehicle is forced and controlled, to move straight forward or straight back through the supporting fluid. No further control means is necessary. The device of the invention ensures stable control of the displacement of the vehicle.

Figure 5:
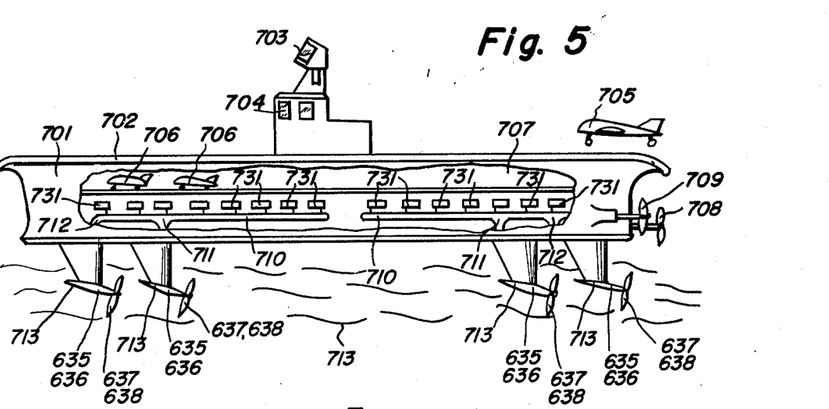
FIG. 5 shows a boat or ship seen from above, employing the basic means of this invention for its sole and entire drive and steering power.

In FIG. 6 the same system is applied as in FIG. 5. Reference numerals of FIG. 5 have been used where the same structure appears in FIG. 6. The body 503 has a cabin 504. The difference from the arrangement of FIG. 5 consists in that the return lines 569 are combined together and that two bypass valves 573 each mounted in a respective bypass line 571 or 572 can connect the delivery lines 553 or 554 respectively with the return line 569. The flow cross-sections of the bypass lines and/or controller 571, 572, 573 are of very small size so that only a minor fraction of the flow through the main delivery lines 533 and 534 can escape through the bypass means. By opening or closing the bypass valves 573 the vehicle can be guided to the left or right. Opening the left valve means move the vehicle to the left and opening the right valve means move it to the right. Thus opening the valve 573 in line 553 reduces flow to the motor 555 to slow the propeller 557, and similar opening of line 554 slows motor 556 and propeller 558. The restriction of the cross-sectional areas through the bypass lines and valves prevents sharp turns and crashes of the craft at high speed.

Figure 1:
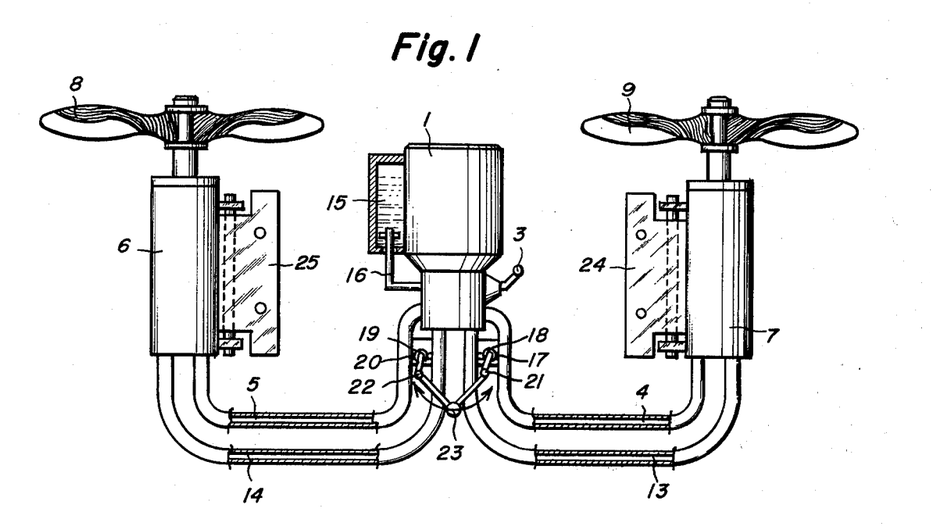
FIG. 1 is a hydrostatic power supply which constitutes an embodiment of this invention and which can be attached to any suitable kind of water-borne vehicle.

The hydrostatic power supply unit of FIG. 1 which is more definitely described as a hydraulically controlled fluid stream unit may be transportable and may be fixed to any kind of vehicle by the means 24 and 25. It is preferred to set the power plant 1 somewhere into or onto the body of the vehicle and to set the rotary members 8 and 9 by means of fixing the bearing means 24 and 25 onto the vehicle on opposite sides of the vehicle body relative to its normal direction of travel. By fixing the hydraulically controlled fluid stream drive means of FIG. 1 onto a vehicle it is possible to drive the vehicle straight forward, or straight vertically, or straight horizontally, or to steer it the left or to the right, or to incline it, or even to turn it completely around on a point by means of the separate flows of fluid through fluid passages 4 and 5 or by operating the bypass means 17, 18 or both together by the combined control means 23. It would be suitable to fix the hydrostatically controlled fluid stream drive means of FIG. 1 to boats, to land vehicles, to cars, to trucks, to sleds, to aircraft, to air-cushion vehicles, or to any other kinds of vehicles which move through a fluid so that the rotary members 8 and 9 can produce a stream of fluid or streams of fluid for driving the vehicle. It would be possible to connect the fluid motors 6 or 7 to the fastening or bearing means 25 or 24 in such a way that the fluid motors can be swung into the vehicle or out of the vehicle by means of a pivot connected between fastening or bearing means 25 or 24 or fluid motors 6 or 7.

In FIG. 2 again a hydraulically controlled fluid stream drive means is provided which can be fixed permanently to a vehicle or which can be separately transported for later fixing to a vehicle.

In FIG. 1 a separate hydrostatic power supply is shown which can be separately transported and which can be fixed onto any suitable kind of vehicle. For this purpose power plant and fluid-flow producing means 1 is provided and connected to the delivery fluid lines 4 and 5. This fluid flow producing means is shown in U.S. Pat. No. 3,320,898 in FIGS. 61 and 62 and described starting in column 86 at line 27 and ending in column 91 at line 61, which matter is incorporated by reference herein. Delivery fluid lines 4 and 5 are connected to the rotary parts in fluid motors especially positive displacement fluid motors 6 and 7. Rotary members or propellers 8 or 9 are connected to the rotary parts of fluid motors 6 or 7. Return fluid lines 13 and 14 return from the fluid motors 6 or 7 directly or indirectly to the fluid flow producing means 1. Fluid flow producing means 1 may take this fluid out of tank 15 through two lines 16.

Fluid flow producing means 1 is provided with a fluid flow adjustment means 3 able to control the displacement volume of the displacement chambers in fluid flow producing means 1 proportionately to each other. The control adjustment means 3 therefore assures that at all times at least a plurality of flows like a pair of flows of equal rate of flow or of proportional rate of flow is led out of fluid flow producing means 1 separately into the separate fluid lines 4 and 5 so that the proportionality of the rotary angular velocity of rotary members 8 and 9 is the same at all times. Bypass means 17 and 19 may be set between the delivery fluid lines 4 and 5 and the respective return fluid line 13 or 14. The lines 17 and 19 enable the flow of a small fraction of fluid which flows through the delivery fluid lines 4 or 5 into the return fluid lines 13 or 14. The bypass valves 18 or 20 may be operated either separately from each other or they may be operated jointly by a combined operation means 23 which is connected by connection means 21 and 22 to the bypass means 18 and 20. By using the combined handle 23 for controlling both bypass valves it is possible to change the rotary velocity of the rotary members 8 and 9 relative to each other in an improved manner and it is thereby possible by only one handle to change the thrust of the fluid streams produced by rotary members 8 and 9 relative to each other to any desired extent. The pair of fluid streams which is created by rotary members 8 and 9 provide a thrust which is a pair of thrust forces which can be utilized to propel a vehicle or to steer a vehicle. The change of the thrusts in these fluid streams relative to each other by the one combined vehicle 23 makes it possible to change the direction or location of the vehicle.

Figure 2:
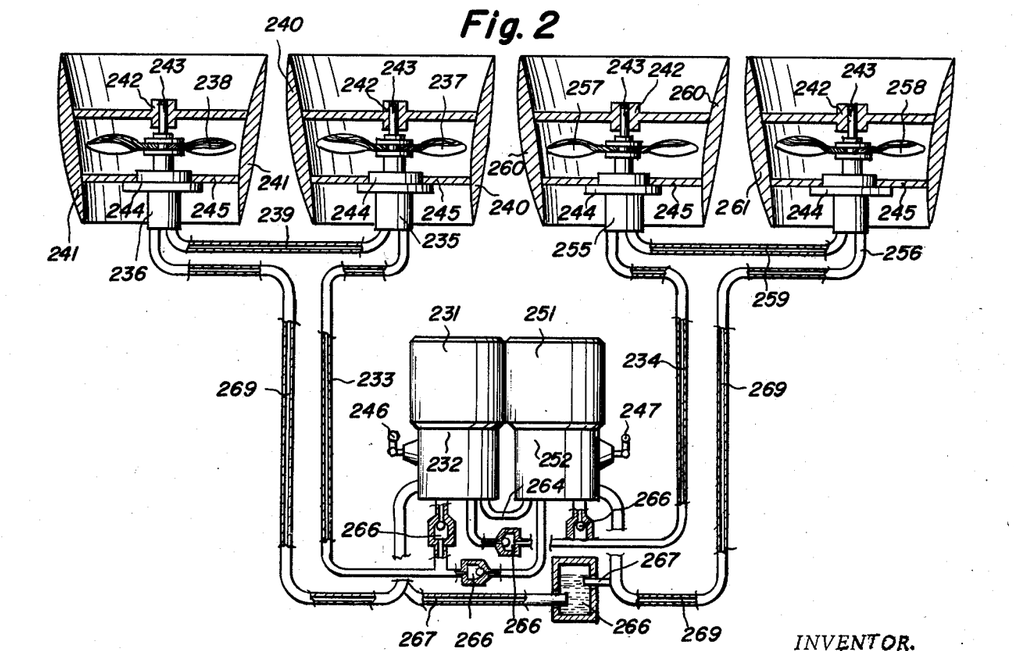
FIG. 2 is a partially sectional view through a hydrostatic power supply unit utilizing a multi-stream drive which constitutes another embodiment of the invention.

There are several special features shown in FIG. 2. One feature is that delivery fluid line 233 transfers a flow of fluid into a positive displacement fluid motor 235 while the return flow out of fluid motor 235 flows through the intermediate passage 239 into a downstream fluid motor 236 whence the return fluid stream flows through return fluid line 269 directly or indirectly back to a respective fluid flow producing means or tank. A second fluid stream is lead through delivery fluid line 234 into positive displacement upstream fluid rotor 255 and out therefrom through an intermediate fluid line 259 into downstream fluid motor 256 and return therefrom through return fluid line 269 directly or indirectly back to a fluid flow producing means or a tank. This assures that two flows of fluid which are separate from each other and which flow through respective fluid lines 233 and 234 together rotate four fluid motors, each driving two fluid motors. Thereby two flows of fluid create four streams of fluid of proportionate rate of flow. For this purpose the rotary parts of the respective fluid motors are connected to the rotary members 238, 237 or 257, 258. Since the fluid flow producing means according to this invention necessarily provides the proportionality of rate of flow in separate flows of fluid it is assured that proportionality of rotary velocity of the fluid motors is assured as well as of the rotary members of propellers 237, 238 and 257, 258. Consequently four fluid streams are created by the hydraulically controlled fluid stream drive means of FIG. 2 and the reaction forces and thereby the thrusts of the fluid streams are maintained proportionate under all operational conditions. As a further characteristic of the embodiment of FIG. 2 the rotary members 237, 238, 257 and 258, are provided in ducts 240, 241, 260 and 261. Thereby the thrusts of the fluid streams relative to the hydrostatically controlled fluid stream drive can be considerably increased. For this purpose fluid motor 235 is carried on a flange 244 in a fastening means 245 of duct or wing 240. The shaft of the rotary member of fluid motor 235 and thereby the rotary member 237 which is attached to the shaft of fluid motor 237 is supported in a bearing 243 of fastening means 242. In the same way fluid motor 236 is fastened by a flange 244 and fastening means 245 of wing or duct 241 and the shaft of fluid motor 236 is guided in a bearing 243 which is fastened on fastening means 242 of duct or wing 241. Fluid motor 255 is carried on a flange 244 on fastening means 245 of duct or wing 260 and the shaft of fluid motor 255 may be supported in a bearing 243 of fastening means 242 of duct 260. Fluid motor 256 may be carried on a flange 244 or fastening means 245 of a wing or duct 261 and the shaft of fluid motor 256 may be supported in a bearing 243 of fastening means 242 of duct or wing 261. The feature of this portion of this part of the embodiment of FIG. 2 is that the propellers or rotary members are safely contained in wings or ducts so that persons or animals could not come accidentally into contact with the rotary members during their revolving. Furthermore, the vehicle has a better appearance with the propeller or rotary members provided in ducts or wings. Furthermore, by the provision of ducts or wings the thrusts of the fluid streams which flow therethrough is considerably increased.

Another characteristic of the embodiment of FIG. 2 is that a plurality of fluid flow producing means 232 and 252 which are actuated or driven by power plants 231 or 251 is provided connected to each other. For example they may have a common return or interconnecting return fluid line 264. They also have two delivery fluid lines 267 which may transfer fluid out of a tank 268 into the respective fluid flow producing means 232 and 252. Each of the fluid flow producing means 232 and 252 produces at least a pair of separate flows of fluid of proportionate rate of flow. One flow of fluid moves out of fluid flow producing means 232 through check valve 266 into fluid line 233 and another flow of fluid of proportionate rate of flow flows separately out of fluid flow producing means 252 through check valve 266 also into the common fluid line 233. By combining the flows of fluid, each coming out of a separate fluid flow producing means 233 and 252, via check valve 266 into a common fluid line 233, the fluid line 233 becomes a common fluid line.

Out from fluid flow producing means 232 another flow of fluid of proportionate rate of flow flows through another check valve 266 into the fluid line or fluid delivery passage 234. Another flow of fluid which is also separate and of proportionate rate of flow flows out of the other fluid flow producing means 252 through another check valve 266 into the fluid line 234. By combining each one flow of fluid out of fluid flow producing means 252 and 232 into one fluid line the fluid line or fluid flow delivery passage 234 also becomes a common delivery fluid line. If now during operation one of the power plants 231 or 251 would fail or if one of the fluid flow producing means 232 or 252 fails to deliver the separate flows of fluid then the other fluid flow producing means would still continue to deliver at least one flow of fluid into the common fluid line 233 and at least one other flow of fluid into the common fluid line 234. The respective check valves 266 would prevent a flow of fluid back out of the common fluid lines 233 or 234 into the respective fluid flow producing means 232 or 252 which is not functioning. Thereby a safe operation of the hydraulically controlled fluid stream drive means is assured and maintained also if one of the provided power plants or if one of the provided fluid flow producing means fails. The return fluid lines 269 may return the flows of fluid from the downstream motors directly or indirectly into the tank 268 or via cooling means into the tank 268 or directly into the respective fluid flow producing means 232 and 252 or into the medial passage therebetween 264. Passage 264 may also be a drain line. The fluid lines 267 may be suction fluid lines or fluid lines which deliver fluid into the fluid flow producing means 232 or 252. Instead of providing only two fluid flow producing means 232 and 252 it is also possible to provide a plurality of fluid flow producing means and of necessary respective power plants 231 or 251 to adapt them to the respective fluid flow producing means 232 or 252.

Fluid flow producing means 232 or 252 are provided with fluid flow adjustment means 246 and 247. Thereby the displacement volumes of the positive displacement chambers in the fluid flow producing means 232 or 252 which change from minimum to maximum and vice versa during their operation are proportionately adjusted so that the subtraction of the minimum volume from the maximum volume of the respective positive displacement chamber remains at all times proportionate to the respective volumes of other of the positive displacement chambers.

It is possible to handle the adjustment control means 246 or 247 separately or together. The hydraulically controlled fluid stream drive of FIG. 2 may be set onto or built into all suitable vehicles which move in or through fluid or which are air-borne therein, such as land vehicles, air vehicles, helicopters, aircraft, boats, ships, submarines, sleds, air-cushion vehicles or the like. Other means may be added to this hydraulically controlled fluid stream drive or some of its parts disclosed therein may be subtracted.

Figure 3:
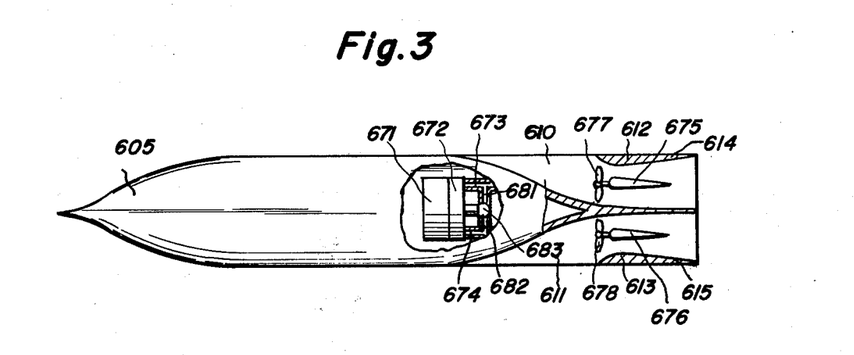
FIG. 3 is a view of another embodiment of this invention, here a hydraulically controlled fluidstream driven vehicle, partially in section, the vehicle being a ship.

In FIG. 3 a ship or aircraft is shown which has a body 605. Fluid flow producing means 672 is provided thereon driven by power plant 671. One flow of fluid of uniform rate of flow or of proportional rate of flow relative to another flow of fluid is separately passed through fluid line 673 into and through the rotary parts of fluid motor 675 and back therefrom directly or indirectly to the fluid flow producing means 672. Another flow of fluid of proportionate or uniform rate of flow relative to the heretofore described flow of fluid is passed from fluid flow producing means 672 through fluid line 674 into and through the rotary parts of fluid motor 676 and flows back therefrom directly or indirectly into the fluid flow producing means 672. A rotary member or propeller 677 or 678 is fixed to the rotary parts of fluid motor 675 or of fluid motor 676. The proportionality of the two separate flows of fluid in the heretofore described system insure the proportionality of the rotary angular velocity of the rotary members 677 and 678. Fluid may be led through intake 610 or 611 to the rotary member 677 or 678 and it may be discharged through outlets 614 or 615.

The fluid motors or revolving members may be provided in respective ducts 613 or 612. Thereby two stable fluid streams are produced and one of them flows through intake 610 via rotary members 677 out of outlet or duct 614 and the other flows through inlet 611 and through rotary members 678 out of outlet 615. Since both fluid streams remain proportionate whenever they appear, stability of the movement of the vehicle of FIG. 3 is provided. The thrust forces of the fluid streams coming out of outlets or ducts 614 or 615 provide the stability and equilibrium of the thrust forces acting on the vehicle and on the resistance forces acting on the vehicle. A suitable configuration of the body 605, or of the duct means, or of the location and configuration of the rotary member means 677 and 678 increases and maintains the stability of the drive of the vehicle. The vehicle is preferred to be a ship for running through water but it could also be an aircraft or rocket-like vehicle moving through air or the stratosphere. Intermediate passages 681 and 682 are connected to the fluid lines 673 or 674 in order to pass additional control flow therethrough in order to let escape a part of the main flows through a control valve 683. The valve 683 lets a portion of the flow of fluid escape out of fluid line 673 or out of fluid line 674 in order to decrease or increase the rate of flow in the respective fluid duct 614 or 615. Thus steering or inclining movement or curving movement of the vehicle in FIG. 3 is effected.

Figure 4:
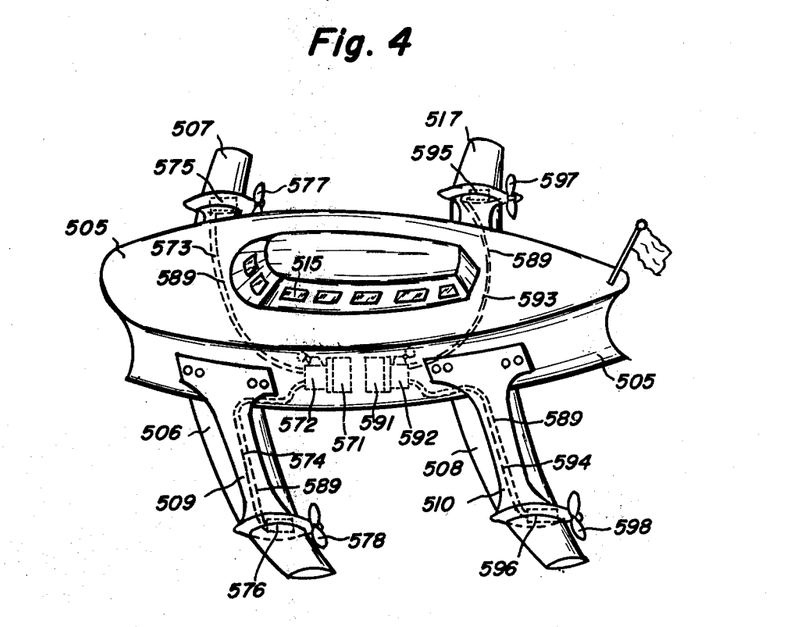
FIG. 4 shows a view of another embodiment of this invention, here a hydraulically controlled fluidstream driven vehicle, the vehicle being a hydrofoil or wing-borne ship or boat.

In FIG. 4 a hydraulically controlled fluidstream driven vehicle is shown which is supported on hydrofoils or wings 506 or 508. The body of the vehicle 505 carries a cabin 515 for passengers or freight, and also carries the power plants 571 and 591 and the fluid flow producing means 572 and 592. Instead of carrying both it would also be enough to carry only one or to carry a plurality thereof. If the vehicle has only one fluid flow producing means 572, then it must provide at least two flows of fluid of equal rate of flow. One separate flow of fluid of uniform rate of flow relative to the other flow or flows of fluid is passed from fluid flow producing means 572 through delivery fluid line 573 into fluid motor 575 for revolving the rotary parts therein and the flow of fluid flows back from fluid motor 575 through return fluid line 589 directly or indirectly back to fluid flow producing means 572. Another flow of fluid of uniform rate of flow relative to the other flow of fluid flows from fluid flow producing means 572 through delivery fluid line 574 into and through fluid rotor 576 for revolving the rotary parts thereof and then flows back through fluid line 589 directly or indirectly into fluid flow producing means 572. The rotary members or propellers 577 or 578 are connected to the rotary parts of the respective fluid motors 575 or 576. The fluid motor 575 is connected to wing or hydrofoil 507 while fluid motor 576 is connected to the wing or hydrofoil 506. Hydrofoil or wing 506 and 507 may be borne by respective fastening or bearing means 509 and thereby connected to the body of the vehicle 505. The fluid motors 575 and 576 are connected to the wings or hydrofoils in spaced locations and preferably distanced sidewards from the centerface of the vehicle 505 by equal distance and the fluid motors 575 and 576 are of equal dimensions. The rotary members 577 and 578 are also of like dimensions.

If the power plant 571 and/or the fluid flow producing means 572 operates and delivers a stream of fluid, the rotary members 577 and 578 are rotated and create streams of proportionate or uniform rate of flow and thereby of proportionate or uniform thrust. Thereby the vehicle is driven through a fluid. The thrusts are so strong that the body of the vehicle 505 is lifted out of the water and is entirely supported by the wings or hydrofoils 506, 507, 508 and 517. If the fluid motors and rotary members 575, 576, 577 and 578 are of like dimensions and equally spaced from the center line of the body 501 then the thrusts created by the fluid streams produced by the respective rotary members are equal and equally distanced from the center line of body 505 so that a stabile forward drive of the vehicle 505 is assured. The resistance forces acting on the wings or on the body 506, 507, 510, 517, 509, 510 and 505 are in equilibrium. The equilibrium between these forces ensures and maintains the stability of movement of the vehicle. The combination of the proportionality of a plurality of flows with the proportionality of fluid streams acting on the vehicle ensures the stability of the movement of the vehicle and the easy control thereof. At the same time the vehicle is very easily built as the relatively small fluid motors create little resistance during movement of the vehicle and the vehicle becomes easy to handle and to control during its movement in fluid. The provision of the heretofore described parts in FIG. 4 alone would already provide the stability of the movement and the drive of the vehicle.

However it is also possible to provide a plurality of such hydrostatic drive and control means and fluid stream producing means for driving the vehicle. For this purpose the fluid flow producing means 592 is driven by the power plant 591. One flow of fluid may then flow from fluid flow producing means 592 through delivery fluid line 593 into and through the rotary parts of fluid motor 595 and back through fluid line 589 directly or indirectly into the power plant 592 again. The other flow of fluid, which will be proportionate to the flow of fluid through fluid line 593, wi'l be led from fluid flow producing means 592 through fluid line 594 into and through the rotary parts of fluid motor 596 and back through return fluid line 589 directly or indirectly into the fluid flow producing means 592 again. The fluid motors 595 or 596 drive revolving members or propellers 597 and 598 and these fluid motors and rotary members are positioned on the wings or hydrofoils 508 and/or 517 at spaced locations but suitably located relative to the body 505 of the vehicle. It would also be possible to provide additional wings or hydrofoils and additional fluid flow producing means, power plants, fluid motors, or revolving members on the vehicle and thereby keep its movement stable and maintain the equilibrium of forces acting on the vehicle during its displacement in a stable manner to control it during all of its motion. The fluid flow producing means 572 or 592 is of the constant-delivery type or of variable delivery. It is preferred to make them as multiflow variable delivery pumps which produce a plurality of separate streams of fluid of proportionate or uniform rate of flow. Respective adjustment means may be provided on the fluid flow producing means.

What is claimed is:

1. A fluid-stream driven water-borne vehicle capable of travelling at elevated speeds and comprising, in combination, a waterborne body having an axis of substantial symmetry; at least one pair of hydraulic fluid-operated motors located symmetrically at opposite sides of said axis; a pair of fluid-stream creating means, each driven by one of said motors and also being located symmetrically at opposite sides of said axis; at least one hydraulic fluid flow producing means having at least one first fluid handling chamber provided with a first outlet, and a second fluid handling chamber provided with at least one second outlet; means fluid-tightly separating said first and second fluid handling chambers from one another, so that fluid from each chamber passes only through the outlet associated with the respective chamber; a pair of displacement means, each associated with one of said fluid handling chambers; actuator means equally cooperating with each of said displacement means for maintaining equal movements of the respective displacement means so that fluid flows in said first and second outlets at equal and proportionate flow rates; and a pair of delivery passages connecting said first outlet with only one of said motors and connecting said second outlet with only the other of said motors, respectively, so that said fluid stream creating means at said opposite sides of said axis are driven at equal velocities and produce equal thrusts, to thereby stabilize both the attitude and the direction of movement of said vehicle in the water.

2. A vehicle, as claimed in claim 1, including flow adjusting means connected to said fluid flow producing means and operable to adjust the flow through the two outlets in a proportionate manner to vary the speed of said vehicle.

3. A vehicle, as claimed in claim 1, in which said motors, said fluid stream creating means, said fluid flow producing means and said delivery passages constitute a hydraulic driving end control unit which is self contained and independently transportable for mounting on a vehicle as a unit.

4. A vehicle, as claimed in claim 3, including a respective counting adapter connected to each motor, each motor being pivotally connected to its associated adapter for swinging into and out of said body.

5. A vehicle, as claimed in claim 3, including a pair of hydraulic fluid flow producing means each having corresponding first outlets commonly connected to the motors on one side of said axis and corresponding second outlets commonly connected to the motors on the opposite side of said axis; and check valve means in the interconnections between said pair of fluid flow producing means preventing flow of fluid from an outlet of one fluid flow producing means to an outlet of the other fluid producing means in the event of failure of the other fluid flow producing means.

6. A vehicle, as claimed in claim 1, including plural pairs of hydraulic fluid motors; and connecting means connecting one outlet of said fluid flow producing means to a motor on one side of said axis and including an intermediate line connecting a motor on the opposite side of said axis in series with said motor on said one side of said axis, and the other outlet of said fluid flow producing means having a motor on one side of said axis and a motor on the opposite side of said axis connected in series thereto.

7. A vehicle, as claimed in claim 1, including additional separately actuated fluid flow producing means selectively operable to vary the relative rates of flow of hydraulic fluid to the fluid-stream creating means on respective sides of said axis to effect a turning movement of said vehicle.

8. A vehicle, as claimed in claim 1, in which a respective bypass line is associated to at least one motor on each side of said vehicle; each bypass line restricting the rate of flow therethrough to a minor fraction of the main flows and constituted by a passage portion having a rate of flow restricting narrow cross-sectional area; and a respective bypass flow control means associated with each bypass line.

9. A vehicle, as claimed in claim 8, including a common manually operable control device connected to both of said bypass control means for conjoint operation of the latter.

10. A vehicle, as claimed in claim 7, in which said additional hydraulic fluid flow producing means is connected to a motor on one side of said axis and restricted in rate of flow to a minor fraction of the main flows; and a control device interposed between said additional fluid flow means and said last-mentioned motor.

11. A high-speed watercraft comprising:
a floatable body having a centerline;
a pair of hydraulic motors on said body symmetrically flanking said centerline and each having a respective fluid inlet and fluid outlet;
a propeller on each of said motors directed in line with said centerline;
a pair of hydraulic pumps on said body each having a pair of separate and noncommunicating working chambers each having a respective fluid intake and fluid output;
two pairs of check valves, each valve of the one valve pair having one side connected to a respective output of one of said pumps and each valve of the other valve pair having one side connected to a respective output of the other of said pumps, said check valves permitting fluid flow out of the respective outputs only;
one feed conduit connecting the other side of one check valve of one valve pair and the other side of one check valve of the other pair to the inlet of one of said motors;
another feed conduit connecting the other side of the other check valve of the one valve pair and the other side of the other check valve of the other valve pair to the inlet of the other motor;
return conduit means connecting the outlets of said motors to said inputs; and
a pair of independent drives each connected to a respective one of said pumps.

* * * * *